US009322279B2

(12) United States Patent
Spangler et al.

(10) Patent No.: US 9,322,279 B2
(45) Date of Patent: Apr. 26, 2016

(54) AIRFOIL COOLING ARRANGEMENT (75) Inventors: Brandon W. Spangler, Vernon, CT (US); Russell J. Bergman, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 940 days.

(21) Appl. No.: 13/539,838

(22) Filed: Jul. 2, 2012

(65) Prior Publication Data
US 2014/0010632 A1  Jan. 9, 2014

(51) Int. Cl.
F01D 5/18 (2006.01)
F01D 9/06 (2006.01)

(52) U.S. Cl.
CPC ............... F01D 5/186 (2013.01); F01D 9/065 (2013.01); *Y02T 50/676* (2013.01)

(58) Field of Classification Search
CPC ..... F01D 9/065; F01D 25/12; F05D 2230/11; F05D 2260/202
USPC .................................................. 415/115, 116
See application file for complete search history.

(56) References Cited

U.S. PATENT DOCUMENTS

| 4,012,167 | A |   | 3/1977 | Noble |   |
|---|---|---|---|---|---|
| 4,017,213 | A |   | 4/1977 | Przirembel |   |
| 4,153,386 | A | * | 5/1979 | Leogrande et al. | 415/115 |
| 4,992,025 | A |   | 2/1991 | Stroud et al. |   |
| 5,326,224 | A | * | 7/1994 | Lee | F01D 5/186 416/90 R |
| 5,342,172 | A | * | 8/1994 | Coudray | F01D 5/186 416/95 |
| 5,413,458 | A |   | 5/1995 | Calderbank |   |
| 5,417,545 | A |   | 5/1995 | Harrogate |   |
| 5,419,681 | A | * | 5/1995 | Lee | F01D 5/186 415/115 |
| 5,470,198 | A |   | 11/1995 | Harrogate et al. |   |
| 5,498,133 | A | * | 3/1996 | Lee | F01D 5/186 416/97 R |
| 5,660,525 | A | * | 8/1997 | Lee | F01D 5/186 416/96 R |
| 5,779,437 | A | * | 7/1998 | Abdel-Messeh | F01D 5/186 415/115 |
| 6,092,982 | A | * | 7/2000 | Ikeda | F01D 5/186 137/806 |
| 6,164,912 | A | * | 12/2000 | Tabbita | F01D 5/186 416/97 R |
| 6,200,087 | B1 | * | 3/2001 | Tung et al. | 415/115 |
| 6,241,467 | B1 |   | 6/2001 | Zelesky et al. |   |
| 6,254,333 | B1 |   | 7/2001 | Merry |   |
| 6,270,317 | B1 | * | 8/2001 | Manning et al. | 416/97 R |
| 6,287,075 | B1 |   | 9/2001 | Kercher |   |
| 6,354,797 | B1 | * | 3/2002 | Heyward et al. | 415/191 |
| 6,382,908 | B1 | * | 5/2002 | Keith et al. | 415/115 |
| 6,398,489 | B1 |   | 6/2002 | Burdgick et al. |   |
| 6,503,054 | B1 |   | 1/2003 | Bielck et al. |   |
| 6,722,851 | B1 |   | 4/2004 | Brittingham et al. |   |
| 6,744,010 | B1 |   | 6/2004 | Pepe et al. |   |

(Continued)

OTHER PUBLICATIONS

International Search Report and Written Opinion for International Application No. PCT/US2013/047224 completed on Sep. 25, 2013.

(Continued)

*Primary Examiner* — Sean J Younger
(74) *Attorney, Agent, or Firm* — Carlson, Gaskey & Olds (57) ABSTRACT

An airfoil according to an exemplary embodiment of the present disclosure can include an airfoil body having a plurality of film cooling holes that extend through an exterior surface of the airfoil body. Each of the plurality of film cooling holes break through the exterior surface at geometric coordinates in accordance with Cartesian coordinate values of X, Y and Z as set forth in Table 1. Each of the geometric coordinates is measured from a reference point on a leading edge rail of a platform of the airfoil.

15 Claims, 3 Drawing Sheets

(56) References Cited

U.S. PATENT DOCUMENTS

| | | | |
|---|---|---|---|
| 7,004,720 B2 | 2/2006 | Synnott et al. | |
| 7,019,257 B2 | 3/2006 | Stevens | |
| 7,214,901 B1 * | 5/2007 | Ball et al. | 219/69.17 |
| 7,223,072 B2 | 5/2007 | Riahi et al. | |
| 7,249,934 B2 | 7/2007 | Palmer et al. | |
| 7,300,251 B2 * | 11/2007 | Kitamura | F01D 5/186 416/232 |
| 7,500,823 B2 * | 3/2009 | Bolms | F01D 5/186 415/115 |
| 7,510,367 B2 * | 3/2009 | Liang | F01D 5/145 415/115 |
| 7,621,718 B1 * | 11/2009 | Liang | 415/115 |
| 7,682,132 B2 * | 3/2010 | Sugimoto | F01D 5/186 416/97 R |
| 7,695,247 B1 | 4/2010 | Liang | |
| 7,806,650 B2 | 10/2010 | Heyward et al. | |
| 7,921,654 B1 | 4/2011 | Liang | |
| 8,197,210 B1 * | 6/2012 | Liang | F01D 5/145 416/96 A |
| 2005/0089394 A1 | 4/2005 | Lu et al. | |
| 2008/0317585 A1 | 12/2008 | Lee et al. | |
| 2009/0155050 A1 * | 6/2009 | Broomer et al. | 415/115 |
| 2010/0047056 A1 | 2/2010 | Lee et al. | |
| 2010/0068032 A1 | 3/2010 | Liang | |
| 2010/0124484 A1 * | 5/2010 | Tibbott | F01D 5/188 415/115 |
| 2010/0254801 A1 * | 10/2010 | Tibbott | F01D 5/186 415/115 |
| 2010/0310367 A1 * | 12/2010 | Devore et al. | 416/1 |
| 2011/0097191 A1 | 4/2011 | Bunker | |

OTHER PUBLICATIONS

International Preliminary Report on Patentability for International Application No. PCT/US2013/047224 completed on Jan. 15, 2015.

* cited by examiner

AIRFOIL COOLING ARRANGEMENT

BACKGROUND

This disclosure relates to a gas turbine engine, and more particularly to an airfoil that may be incorporated into a gas turbine engine. The airfoil can include a plurality of film cooling holes as part of an airfoil cooling arrangement for cooling the airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Each of the blades and vanes include airfoils that extend into the core flow path of the gas turbine engine. The airfoils can include a plurality of film cooling holes as part of an airfoil cooling arrangement of the airfoil. Cooling airflow is communicated into an internal core of the airfoil and can be discharged through the plurality of film cooling holes to provide a boundary layer of film cooling air along the external surface of the airfoil. The film cooling air provides a barrier that protects the underlying substrate of the airfoil from the hot combustion gases that are communicated within the core flow path.

SUMMARY

An airfoil according to an exemplary embodiment of the present disclosure can include an airfoil body having a plurality of film cooling holes that extend through an exterior surface of the airfoil body. Each of the plurality of film cooling holes break through the exterior surface at geometric coordinates in accordance with Cartesian coordinate values of X, Y and Z as set forth in Table 1. Each of the geometric coordinates can be measured from a reference point on a leading edge rail of a platform of the airfoil.

In a further embodiment of the foregoing airfoil embodiment, the airfoil can include a first stage turbine vane.

In a further embodiment of either of the foregoing airfoil embodiments, the Cartesian coordinate values of Table 1 can be expressed in inches.

In a further embodiment of any of the foregoing airfoil embodiments, the reference point can include a pin hole of the platform.

In a further embodiment of any of the foregoing airfoil embodiments, the plurality of film cooling holes can be spaced along a span of the airfoil body in multiple collinearly aligned rows.

In a further embodiment of any of the foregoing airfoil embodiments, a first portion of the plurality of film cooling holes can be cone shaped and a second portion of the plurality of film cooling holes can be round shaped.

In a further embodiment of any of the foregoing airfoil embodiments, at least a portion of the plurality of film cooling holes can be arranged in a herringbone configuration.

In a further embodiment of any of the foregoing airfoil embodiments, the plurality of film cooling holes can be disposed on a pressure side, a suction side and a leading edge of the airfoil body.

In a further embodiment of any of the foregoing airfoil embodiments, the plurality of film cooling holes on the pressure side can be cone shaped and at least a portion of the plurality of film cooling holes on the suction side can be cone shaped.

In a further embodiment of any of the foregoing airfoil embodiments, a first portion of the film cooling holes from a point of the airfoil body toward an outer platform are angled toward the outer platform and a second portion of the plurality of film cooling holes from the point toward an inner platform are angled inwardly toward the inner platform.

An airfoil according to another exemplary embodiment of the present disclosure includes an airfoil body that includes a pressure side and a suction side that extend in chord between a leading edge and a trailing edge and extend in span between an inner platform and an outer platform. Multiple rows of film cooling holes can be disposed through an exterior surface of the airfoil body on at least the pressure side, the suction side and the leading edge. The multiple rows of film cooling holes of the pressure side can include cone shaped film cooling holes, the multiple rows of film cooling holes of the suction side can include both the cone shaped film cooling holes and round shaped film cooling holes, and the multiple rows of film cooling holes of the leading edge can include round shaped film cooling holes.

In a further embodiment of the foregoing airfoil embodiments, at least a portion of the multiple rows of film cooling holes are arranged in a herringbone configuration.

In a further embodiment of either of the foregoing airfoil embodiments, each film cooling hole of the multiple rows of film cooling holes can break through the exterior surface at geometric coordinates in accordance with Cartesian coordinate values of X, Y and Z as set forth in Table 1. Each of the geometric coordinates can be measured from a center point of a pin hole located on a leading edge rail of the inner platform.

In a further embodiment of any of the foregoing airfoil embodiments, at least a portion of the multiple rows of film cooling holes can be disposed on fillets that extend between both of the inner platform and the airfoil body and the outer platform and the airfoil body.

A vane according to yet another embodiment of the present disclosure includes an airfoil body that extends between an inner platform and an outer platform. The airfoil body includes a plurality of film cooling holes that extend through an exterior surface of the airfoil body. Each of the plurality of film cooling holes break through the exterior surface at geometric coordinates in accordance with Cartesian coordinate values of X, Y and Z as set forth in Table 1. Each of the geometric coordinates are measured from a reference point located on a leading edge rail of the inner platform.

In a further embodiment of the foregoing vane embodiment, the vane is a first stage turbine vane.

In a further embodiment of either of the foregoing vane embodiments, a first portion of the plurality of film cooling holes are cone shaped and a second portion of the plurality of film cooling holes are round shaped.

In a further embodiment of any of the foregoing vane embodiments, at least a portion of the plurality of film cooling holes are arranged in a herringbone configuration.

In a further embodiment of any of the foregoing vane embodiments, the reference point can include a center point of a pin hole of the inner platform.

In a further embodiment of any of the foregoing vane embodiments, the plurality of film cooling holes on a pressure side of an airfoil body are cone shaped and at least a portion of the plurality of film cooling holes on a suction side of the airfoil body are cone shaped.

The various features and advantages of this disclosure will become apparent to those skilled in the art from the following detailed description. The drawings that accompany the detailed description can be briefly described as follows.

DETAILED DESCRIPTION

Figure 1:
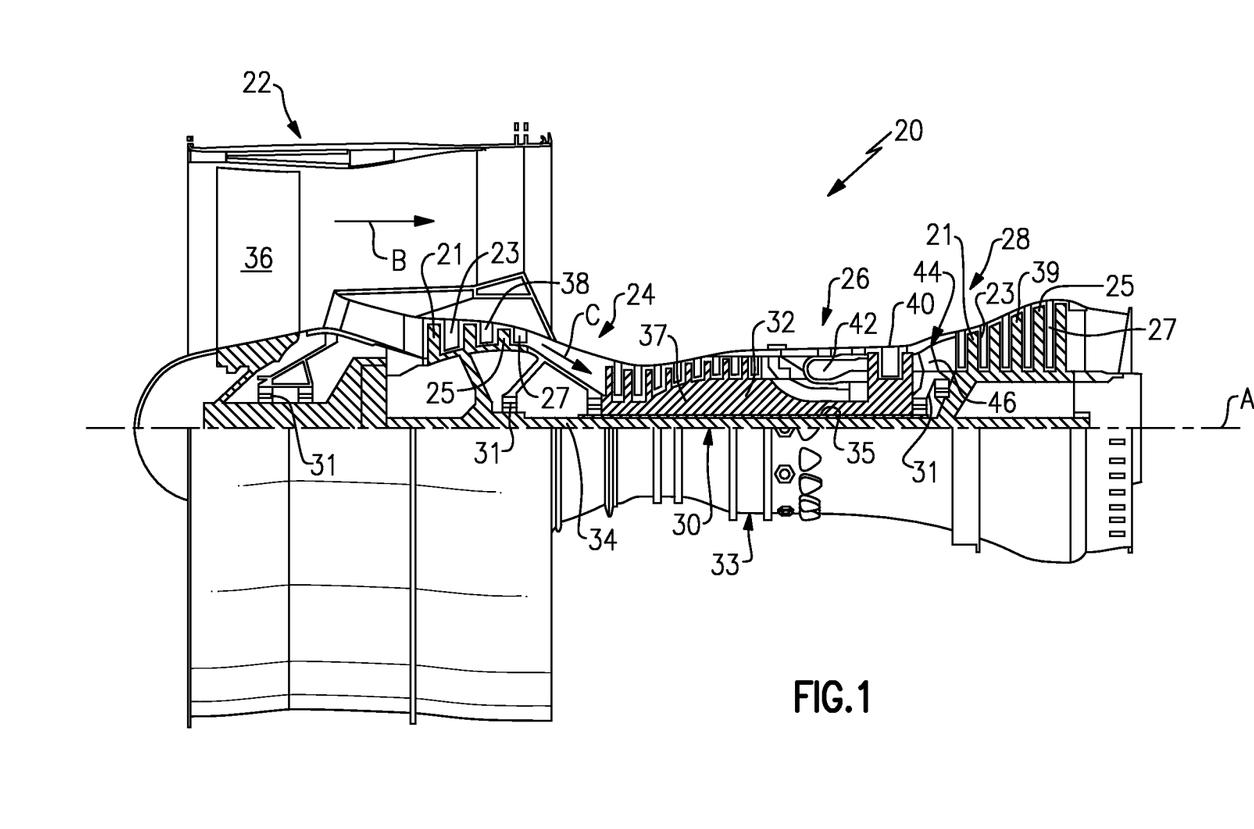
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that additional bearing systems 31 may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that may be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In some non-limiting examples, the gas turbine engine 20 is a high-bypass geared aircraft engine. In a further example, the gas turbine engine 20 bypass ratio is greater than about six (6:1). The example gas turbine engine 20 can be a geared turbofan engine that includes an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds which can increase the operational efficiency of the low pressure compressor 38 and low pressure turbine 39 and render increased pressure in a fewer number of stages.

The low pressure turbine 39 pressure ratio is pressure measured prior to the inlet of the low pressure turbine 39 as related to the pressure at the outlet of the low pressure turbine 39 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry one or more airfoils that may extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from core airflow that is communicated through the gas turbine engine 20. The vanes 27 of the vane assemblies direct core airflow to the blades 25 of the rotor assemblies to either add or extract energy.

Various components of the gas turbine engine 20, including airfoils of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require airfoil cooling arrangements for cooling the airfoils that extend into the core flow path C. Exemplary airfoil cooling arrangements that include internal cooling circuits and film cooling holes are described herein.

Figure 2:
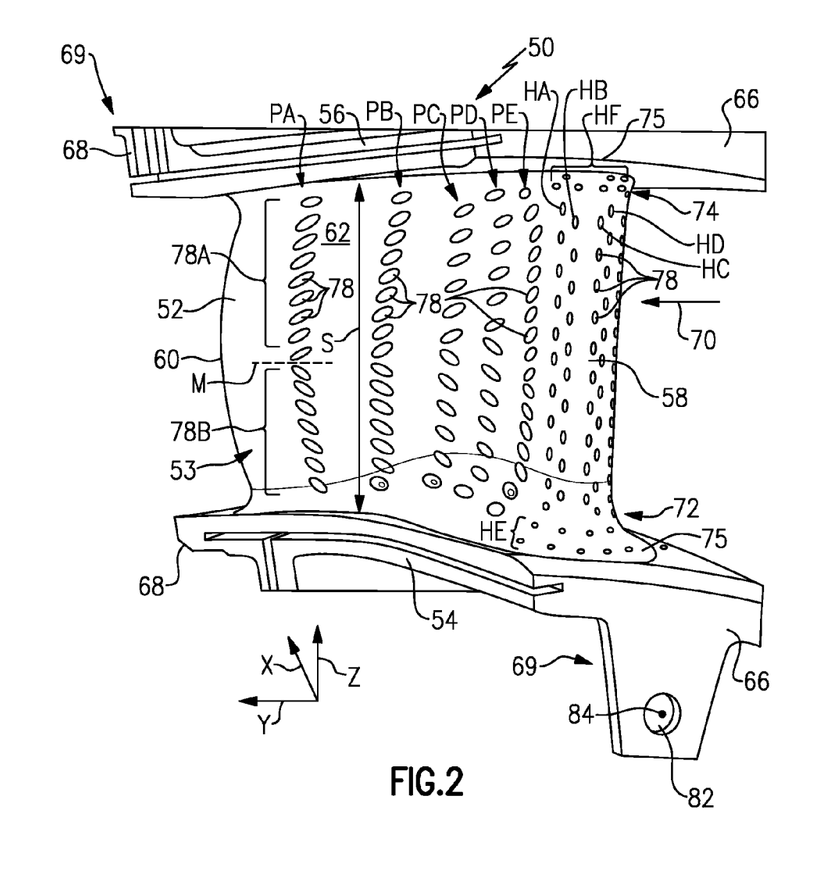
FIG. 2 illustrates an airfoil that can be incorporated into a gas turbine engine as viewed from a pressure side of the airfoil.
Figure 3:
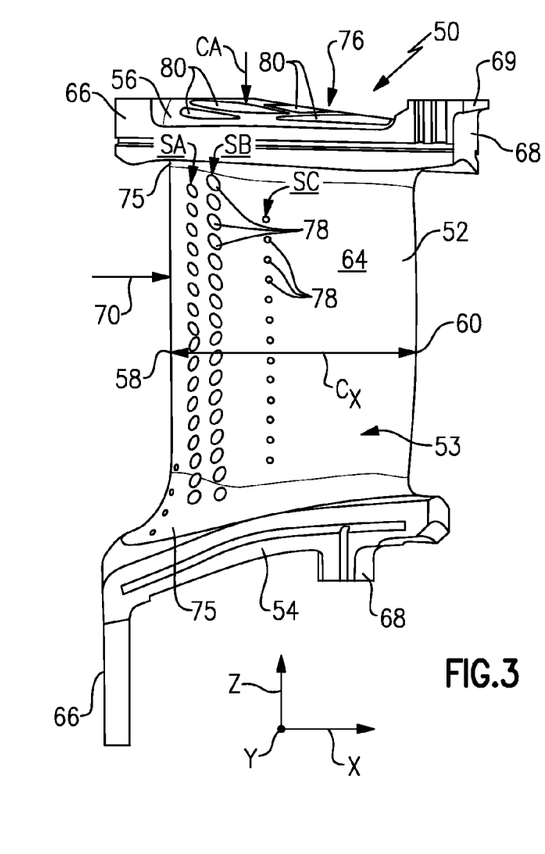
FIG. 3 illustrates another view of the airfoil of FIG. 2 as viewed from a suction side of the airfoil.

FIGS. 2 and 3 illustrate an airfoil 50 that may be incorporated into a gas turbine engine, such as the gas turbine engine 20. In this disclosure, the term "airfoil" is defined to encompass both blades and vanes. The airfoil 50 of this particular embodiment is a first stage turbine vane of the turbine section 28. However, this disclosure is not limited to this particular airfoil and could extend to any airfoil that is disposed within the core flow path C of the gas turbine engine 20.

The airfoil 50 includes an airfoil body 52 that extends between an inner platform 54 (on an inner diameter side) and an outer platform 56 (on an outer diameter side). The airfoil 50 also includes a leading edge 58, a trailing edge 60, a pressure side 62 and a suction side 64. The airfoil body 52, including the pressure side 62 and the suction side 64, extends in chord Cx between the leading edge 58 and the trailing edge 60 and extends in span S between the inner platform 54 and the outer platform 56.

A gas path 70 is communicated axially downstream through the gas turbine engine 20 in a direction that extends from the leading edge 58 toward the trailing edge 60 of the airfoil body 52. The gas path 70 (for the communication of core airfoil along the core flow path C) extends between an inner gas path 72 associated with the inner platform 54 and an outer gas path 74 associated with the outer platform 56 of the airfoil 50. The inner platform 54 and the outer platform 56 are connected to the airfoil 50 at the inner and outer gas paths 72, 74 via fillets 75.

Both the inner platform 54 and the outer platform 56 include leading edge rails 66 and trailing edge rails 68 having one or more engagement features 69 for mounting the airfoil 50 to the gas turbine engine 20, such as to an engine casing. Other engagement feature configurations are contemplated as within the scope of this disclosure, including but not limited to, hooks, rails, bolts, rivets, tabs and/or other features that can be incorporated into the airfoil 50 to retain the airfoil 50 to the gas turbine engine 20. In this exemplary embodiment, the leading edge rail 66 of the inner platform 54 includes a pin hole 82 having a center point 84 (See FIG. 2).

The airfoil 50 includes an airfoil cooling arrangement that can include an internal cooling circuit 76 and a plurality of film cooling holes 78 that extend through an exterior surface 53 of the airfoil body 52. The internal cooling circuit 76 can receive a cooling airflow CA to cool the internal surfaces of the airfoil 50 (See FIG. 3). In one exemplary embodiment, the cooling airflow CA is a bleed airflow that can be sourced from the compressor section 24 or any other portion of the gas turbine engine 20 that is upstream from the airfoil 50. The internal cooling circuit 76 may include one or more cavities 80 that define hollow openings within the airfoil body 52. The cooling airflow CA can be communicated through the cavities 80, which extend across an entire length of the airfoil body 52, to cool the internal surfaces of the airfoil body 52.

The plurality of film cooling holes 78 of the airfoil cooling arrangement can be formed through the airfoil body 52 (between the exterior surface 53 and one or more of the cavities 80) such that each film cooling hole 78 breaks out through the exterior surface 53 of the airfoil body 52. In this exemplary embodiment, each of the leading edge 58, the pressure side 62 and the suction side 64 includes a plurality of film cooling holes 78. The film cooling holes 78 may embody a cone shape or a round shape. Other shapes are also contemplated as within the scope of this disclosure. In one exemplary embodiment, a first portion of the plurality of film cooling holes 78 are cone shaped and a second portion of the plurality of film cooling holes 78 are round shaped.

The plurality of film cooling holes 78 are spaced apart along the span S of the airfoil body 52 in multiple collinearly aligned rows for discharging the cooling airflow CA and providing a boundary layer of film cooling air along the exterior surface 53 of the airfoil body 52. In this exemplary embodiment, the pressure side 62 includes rows PA, PB, PC, PD and PE of film cooling holes 78 (See FIG. 2), the suction side 64 includes rows SA, SB and SC of film cooling holes 78 (See FIG. 3), and the leading edge 58 includes rows HA, HB, HC, HD, HE and HF of film cooling holes 78 (See FIG. 2). In this disclosure, rows identified with the letter "P" refer to the rows of the pressure side 62, rows identified with the letter "S" refer to the rows of the suction side 64, and rows identified with the letter "H" refer to the rows of the leading edge 58.

At least a portion of the multiple rows of film cooling holes 78 may embody a herringbone configuration. In this exemplary embodiment, each of the rows that include cone shaped film cooling holes may embody the herringbone configuration. For example, with reference to row PA, a first plurality of film cooling holes 78A (from a point M of the airfoil body 52 toward the outer platform 56) are angled such that an internal break out of the hole is toward the outer platform 56, while a second portion of the plurality of film cooling holes 78B (from the point M toward the inner platform 54) are angled inwardly such that an internal break out is toward the inner platform 54. For every film row with a herringbone configuration, the radial location of the point M where the film cooling holes 78 transition from pointing toward the outer platform 56 to pointing toward the inner platform 54 can be tailored to meet the cooling and manufacturing needs of the airfoil 50.

In one exemplary embodiment, rows PA and PB of the film cooling holes 78 each include 16. Row PC can include 12 holes and Row PD can include 13 holes. Row PE can include 17 holes. In this embodiment, each film cooling hole 78 of the pressure side 62 of the airfoil body 52 is cone-shaped. The diameter, surface angle and pitch of the film cooling holes 78 can vary depending on design specific parameters including but not limited to the size of the airfoil 50.

Row SA of the film cooling holes 78 can include 17 holes. Row SB of the film cooling holes 78 can include 18 holes. Row SC of the film cooling holes 78 can include 13. In this exemplary embodiment, the film cooling holes 78 of rows SA and SB are cone shaped and the film cooling holes 78 of row SC are round shaped.

Rows HA, HB, HC and HD can include 11, 10, 10 and 11 film cooling holes 78, respectively. Each of the film cooling holes 78 of rows HA, HB, HC and HD are round, in this particular embodiment.

The fillets 75 of the inner platform 54 and the outer platform 56 can also include rows HE (on inner platform 54 fillet 75) and HF (on outer platform 56 fillet 75) of film cooling holes 78. Rows HE and HF can each include 9 holes.

The breakout point of each film cooling hole 78 refers to the geometric location along the airfoil body 52 at which the film cooling hole 78 centerline breaks through or protrudes out of the exterior surface 53. The breakout points of each of the plurality of film cooling holes 78 can be described in terms of sets of Cartesian coordinates defined along x, y and z axes as measured from a specific reference point of the airfoil 50, as is further discussed below. As shown in FIGS. 2 and 3 (with continued reference to FIG. 1), the x axis is defined along the direction of the engine centerline longitudinal axis A, the y axis is defined in a substantially circumferential or rotational direction about the engine centerline longitudinal axis A, and the z axis is defined in a radial direction that is substantially perpendicular to the engine centerline longitudinal axis A.

Figure 4:
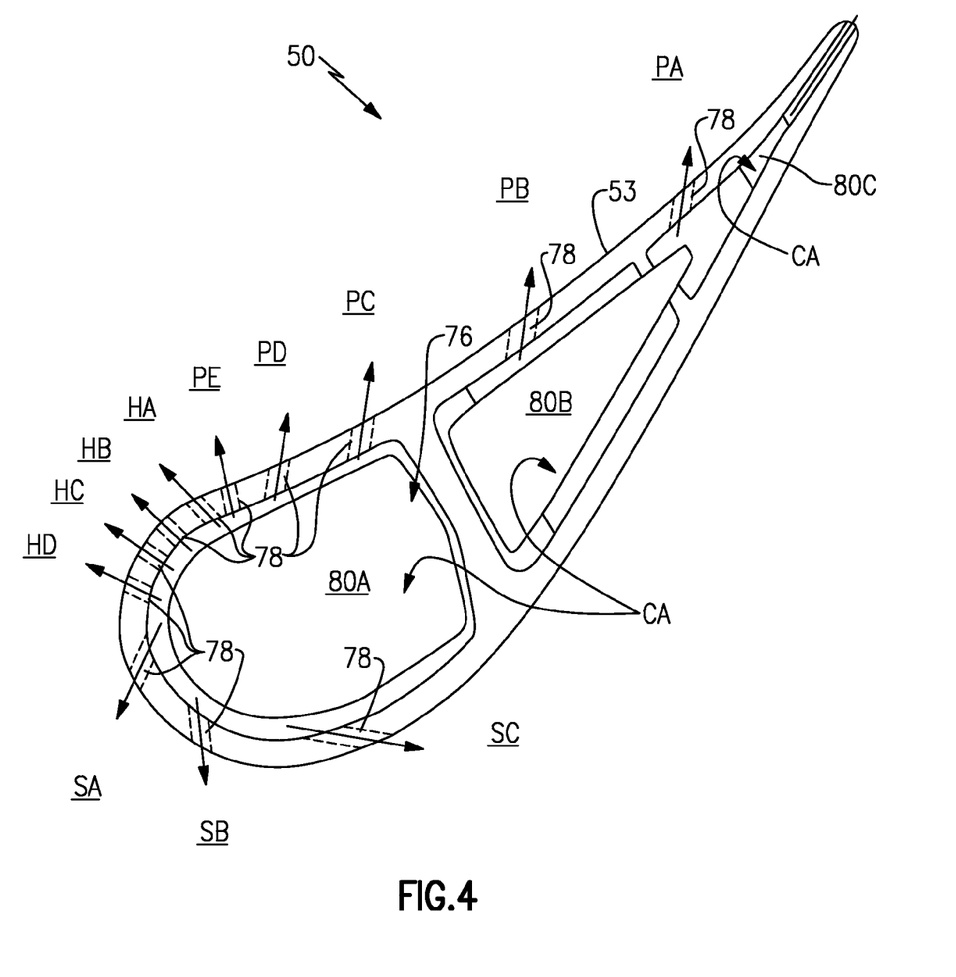
FIG. 4 illustrates a cross-sectional view of an airfoil that includes a plurality of film cooling holes as part of an airfoil cooling arrangement of the airfoil.

FIG. 4 illustrates a cross-sectional view of an exemplary airfoil 50. The internal cooling circuit 76 of the airfoil 50 includes multiple cavities 80A-80C that can receive cooling airflow CA to cool the internal surfaces of the airfoil 50. The plurality of film cooling holes 78 are in fluid communication with one or more of the cavities 80A-80C. FIG. 4 illustrates a portion of each of the rows of film cooling holes 78 with the exception of rows HE and HF, which are omitted in this cross-sectional view. Cooling airflow CA can be communicated into and through the cavities 80A-80C and can then be discharged through the plurality of film cooling holes 78 to provide a boundary layer of film cooling air along the exterior surface 53 of the airfoil 50. The film cooling air may provide a barrier that protects the underlying substrate of the airfoil 50 from the hot combustion gases that are communicated within the core flow path C.

Table 1 (see below) illustrates a Cartesian coordinate system for the x, y and z coordinate values that correspond to the geometric coordinates of each film cooling hole 78 of each row of the plurality of film cooling holes 78. The Cartesian coordinate system has orthogonally related x, y and z axes. In this exemplary embodiment, each of the geometric coordinates are measured from a pin hole 82 of the leading edge rail 66 of the inner platform 54 of the airfoil 50. By measuring the geometric coordinates (in terms of x, y and z values) from a center point 84 of the pin hole 82, the external break through points of each film cooling hole 78 of the airfoil 50 can be ascertained. The Table 1 values for the x, y and z coordinates represent the true position of a nominal part and are listed in inches in this embodiment. However, the values of Table 1 could be converted to millimeters by multiplying by 25.4, or could be converted to any other units. The manufacturing tolerance involved in the location of each film cooling hole 78 is a diameter of approximately between 0 and 0.200 inches (5.08 mm) measured from the surface of the part. In other words, due to manufacturing tolerances, the external breakout of the centerline of each film cooling hole 78 can fall within a 0.200 inch diameter circle enscribed on the surface of the airfoil 50.

Table 1 identifies each film cooling hole 78 of each of the multiple of rows by assigning a unique, three-letter identifier to each film cooling hole 78. The first two letters of the three-letter identifier identify the row (HA, PA, SA, etc.) where the film cooling hole 78 is located. The third letter corresponds to the specific hole number of the particular row identified by the first two letters. The film cooling holes 78 of each row (with the exception of rows HE and HF) are numbered from the inner platform 54 in a direction toward the outer platform 56, with the letter A representing the film cooling hole 78 closest to the inner platform 54 and subsequent letters assigned to the film cooling holes 78 in a direction toward the outer platform 56 (i.e., B, C, D, etc). The film cooling holes 78 of rows HE and HF are assigned in a direction from the pressure side 62 toward the suction side 64 (see FIG. 2), with letter A representing the film cooling hole 78 closest to the pressure side 62 (left side of FIG. 2) and subsequent letters being assigned to the film cooling holes 78 toward the suction side 64 (right side of FIG. 2). The airfoil 50 of this particular embodiment includes a total of 182 film cooling holes 78.

TABLE 1

| Hole# | | Xo | Yo | Zo | Tolerance Zone |
|---|---|---|---|---|---|
| HAA | 1 | 0.253 | 0.710 | 0.907 | 0.200 |
| HAB | 2 | 0.283 | 0.728 | 1.029 | 0.200 |
| HAC | 3 | 0.285 | 0.729 | 1.165 | 0.200 |
| HAD | 4 | 0.286 | 0.729 | 1.308 | 0.200 |
| HAE | 5 | 0.287 | 0.729 | 1.450 | 0.200 |
| HAF | 6 | 0.288 | 0.728 | 1.593 | 0.200 |
| HAG | 7 | 0.288 | 0.729 | 1.695 | 0.200 |
| HAH | 8 | 0.287 | 0.729 | 1.836 | 0.200 |
| HAJ | 9 | 0.287 | 0.728 | 1.977 | 0.200 |
| HAK | 10 | 0.287 | 0.727 | 2.119 | 0.200 |
| HAL | 11 | 0.289 | 0.723 | 2.271 | 0.200 |
| HBA | 12 | 0.237 | 0.805 | 0.931 | 0.200 |
| HBB | 13 | 0.256 | 0.808 | 1.079 | 0.200 |
| HBC | 14 | 0.257 | 0.808 | 1.243 | 0.200 |
| HBD | 15 | 0.257 | 0.807 | 1.386 | 0.200 |
| HBE | 16 | 0.257 | 0.807 | 1.528 | 0.200 |
| HBF | 17 | 0.257 | 0.807 | 1.621 | 0.200 |
| HBG | 18 | 0.257 | 0.807 | 1.763 | 0.200 |
| HBH | 19 | 0.257 | 0.807 | 1.934 | 0.200 |
| HBJ | 20 | 0.257 | 0.808 | 2.095 | 0.200 |
| HBK | 21 | 0.257 | 0.806 | 2.250 | 0.200 |
| HCA | 22 | 0.237 | 0.887 | 0.930 | 0.200 |
| HCB | 23 | 0.255 | 0.888 | 1.082 | 0.200 |
| HCC | 24 | 0.256 | 0.892 | 1.245 | 0.200 |
| HCD | 25 | 0.256 | 0.891 | 1.387 | 0.200 |
| HCE | 26 | 0.256 | 0.891 | 1.530 | 0.200 |
| HCF | 27 | 0.256 | 0.891 | 1.619 | 0.200 |
| HCG | 28 | 0.256 | 0.891 | 1.763 | 0.200 |
| HCH | 29 | 0.255 | 0.887 | 1.935 | 0.200 |
| HCJ | 30 | 0.255 | 0.885 | 2.095 | 0.200 |
| HCK | 31 | 0.255 | 0.885 | 2.248 | 0.200 |
| HDA | 32 | 0.257 | 0.978 | 0.899 | 0.200 |
| HDB | 33 | 0.279 | 0.967 | 1.023 | 0.200 |
| HDC | 34 | 0.279 | 0.966 | 1.169 | 0.200 |
| HDD | 35 | 0.280 | 0.965 | 1.310 | 0.200 |
| HDE | 36 | 0.280 | 0.965 | 1.452 | 0.200 |
| HDF | 37 | 0.280 | 0.964 | 1.594 | 0.200 |
| HDG | 38 | 0.280 | 0.964 | 1.695 | 0.200 |
| HDH | 39 | 0.280 | 0.964 | 1.836 | 0.200 |
| HDJ | 40 | 0.280 | 0.965 | 1.978 | 0.200 |
| HDK | 41 | 0.281 | 0.968 | 2.120 | 0.200 |
| HDL | 42 | 0.284 | 0.975 | 2.261 | 0.200 |
| HEA | 43 | 0.189 | 0.576 | 0.780 | 0.200 |
| HEB | 44 | 0.214 | 0.648 | 0.822 | 0.200 |
| HEC | 45 | 0.121 | 0.691 | 0.761 | 0.200 |
| HED | 46 | 0.178 | 0.763 | 0.820 | 0.200 |
| HEE | 47 | 0.096 | 0.828 | 0.752 | 0.200 |
| HEF | 48 | 0.174 | 0.899 | 0.815 | 0.200 |
| HEG | 49 | 0.118 | 0.962 | 0.752 | 0.200 |
| HEH | 50 | 0.212 | 1.017 | 0.805 | 0.200 |
| HEJ | 51 | 0.188 | 1.088 | 0.752 | 0.200 |
| HFA | 52 | 0.296 | 0.612 | 2.482 | 0.200 |
| HFB | 53 | 0.303 | 0.686 | 2.418 | 0.200 |
| HFC | 54 | 0.230 | 0.717 | 2.482 | 0.200 |
| HFD | 55 | 0.257 | 0.793 | 2.404 | 0.200 |
| HFE | 56 | 0.204 | 0.848 | 2.478 | 0.200 |
| HFF | 57 | 0.256 | 0.906 | 2.402 | 0.200 |
| HFG | 58 | 0.220 | 0.987 | 2.480 | 0.200 |
| HFH | 59 | 0.304 | 1.015 | 2.405 | 0.200 |
| HFJ | 60 | 0.291 | 1.093 | 2.474 | 0.200 |
| PAA | 61 | 1.032 | −0.120 | 0.963 | 0.200 |
| PAB | 62 | 1.035 | −0.143 | 1.047 | 0.200 |
| PAC | 63 | 1.036 | −0.162 | 1.131 | 0.200 |
| PAD | 64 | 1.042 | −0.186 | 1.214 | 0.200 |
| PAE | 65 | 1.043 | −0.200 | 1.300 | 0.200 |
| PAF | 66 | 1.045 | −0.214 | 1.376 | 0.200 |
| PAG | 67 | 1.046 | −0.224 | 1.453 | 0.200 |
| PAH | 68 | 1.051 | −0.242 | 1.552 | 0.200 |
| PAJ | 69 | 1.053 | −0.252 | 1.628 | 0.200 |
| PAK | 70 | 1.054 | −0.258 | 1.713 | 0.200 |
| PAL | 71 | 1.053 | −0.259 | 1.795 | 0.200 |
| PAM | 72 | 1.052 | −0.259 | 1.881 | 0.200 |

TABLE 1-continued

| Hole# | | Xo | Yo | Zo | Tolerance Zone |
|---|---|---|---|---|---|
| PAN | 73 | 1.050 | −0.254 | 1.964 | 0.200 |
| PAP | 74 | 1.049 | −0.250 | 2.050 | 0.200 |
| PAR | 75 | 1.043 | −0.236 | 2.135 | 0.200 |
| PAS | 76 | 1.044 | −0.230 | 2.227 | 0.200 |
| PBA | 77 | 0.849 | 0.143 | 1.016 | 0.200 |
| PBB | 78 | 0.848 | 0.135 | 1.103 | 0.200 |
| PBC | 79 | 0.847 | 0.129 | 1.188 | 0.200 |
| PBD | 80 | 0.847 | 0.121 | 1.272 | 0.200 |
| PBE | 81 | 0.847 | 0.115 | 1.361 | 0.200 |
| PBF | 82 | 0.846 | 0.111 | 1.445 | 0.200 |
| PBG | 83 | 0.845 | 0.108 | 1.524 | 0.200 |
| PBH | 84 | 0.843 | 0.106 | 1.610 | 0.200 |
| PBJ | 85 | 0.842 | 0.102 | 1.690 | 0.200 |
| PBK | 86 | 0.838 | 0.104 | 1.768 | 0.200 |
| PBL | 87 | 0.832 | 0.108 | 1.851 | 0.200 |
| PBM | 88 | 0.829 | 0.109 | 1.935 | 0.200 |
| PBN | 89 | 0.820 | 0.119 | 2.017 | 0.200 |
| PBP | 90 | 0.814 | 0.124 | 2.101 | 0.200 |
| PBR | 91 | 0.805 | 0.135 | 2.184 | 0.200 |
| PBS | 92 | 0.801 | 0.137 | 2.268 | 0.200 |
| PCA | 93 | 0.659 | 0.352 | 0.972 | 0.200 |
| PCB | 94 | 0.666 | 0.356 | 1.120 | 0.200 |
| PCC | 95 | 0.664 | 0.356 | 1.237 | 0.200 |
| PCD | 96 | 0.660 | 0.358 | 1.346 | 0.200 |
| PCE | 97 | 0.656 | 0.361 | 1.461 | 0.200 |
| PCF | 98 | 0.651 | 0.365 | 1.570 | 0.200 |
| PCG | 99 | 0.647 | 0.367 | 1.679 | 0.200 |
| PCH | 100 | 0.643 | 0.369 | 1.793 | 0.200 |
| PCJ | 101 | 0.637 | 0.372 | 1.902 | 0.200 |
| PCK | 102 | 0.625 | 0.383 | 2.017 | 0.200 |
| PCL | 103 | 0.624 | 0.379 | 2.126 | 0.200 |
| PCM | 104 | 0.616 | 0.382 | 2.235 | 0.200 |
| PDA | 105 | 0.508 | 0.470 | 0.942 | 0.200 |
| PDB | 106 | 0.527 | 0.498 | 1.064 | 0.200 |
| PDC | 107 | 0.527 | 0.500 | 1.178 | 0.200 |
| PDD | 108 | 0.527 | 0.502 | 1.292 | 0.200 |
| PDE | 109 | 0.526 | 0.503 | 1.406 | 0.200 |
| PDF | 110 | 0.525 | 0.505 | 1.520 | 0.200 |
| PDG | 111 | 0.523 | 0.507 | 1.634 | 0.200 |
| PDH | 112 | 0.520 | 0.509 | 1.749 | 0.200 |
| PDJ | 113 | 0.516 | 0.511 | 1.863 | 0.200 |
| PDK | 114 | 0.512 | 0.514 | 1.977 | 0.200 |
| PDL | 115 | 0.507 | 0.515 | 2.092 | 0.200 |
| PDM | 116 | 0.502 | 0.516 | 2.206 | 0.200 |
| PDN | 117 | 0.522 | 0.488 | 2.316 | 0.200 |
| PEA | 118 | 0.389 | 0.535 | 0.900 | 0.200 |
| PEB | 119 | 0.398 | 0.592 | 0.999 | 0.200 |
| PEC | 120 | 0.384 | 0.622 | 1.078 | 0.200 |
| PED | 121 | 0.382 | 0.627 | 1.172 | 0.200 |
| PEE | 122 | 0.379 | 0.632 | 1.262 | 0.200 |
| PEF | 123 | 0.380 | 0.634 | 1.350 | 0.200 |
| PEG | 124 | 0.382 | 0.634 | 1.431 | 0.200 |
| PEH | 125 | 0.382 | 0.635 | 1.542 | 0.200 |
| PEJ | 126 | 0.382 | 0.636 | 1.633 | 0.200 |
| PEK | 127 | 0.386 | 0.634 | 1.717 | 0.200 |
| PEL | 128 | 0.390 | 0.631 | 1.806 | 0.200 |
| PEM | 129 | 0.390 | 0.630 | 1.894 | 0.200 |
| PEN | 130 | 0.389 | 0.630 | 1.984 | 0.200 |
| PEP | 131 | 0.387 | 0.630 | 2.074 | 0.200 |
| PER | 132 | 0.385 | 0.630 | 2.164 | 0.200 |
| PES | 133 | 0.399 | 0.616 | 2.252 | 0.200 |
| PET | 134 | 0.425 | 0.589 | 2.336 | 0.200 |
| SAA | 135 | 0.377 | 1.087 | 0.901 | 0.200 |
| SAB | 136 | 0.377 | 1.079 | 0.978 | 0.200 |
| SAC | 137 | 0.377 | 1.075 | 1.059 | 0.200 |
| SAD | 138 | 0.377 | 1.072 | 1.136 | 0.200 |
| SAE | 139 | 0.376 | 1.069 | 1.217 | 0.200 |
| SAF | 140 | 0.376 | 1.067 | 1.299 | 0.200 |
| SAG | 141 | 0.376 | 1.065 | 1.384 | 0.200 |
| SAH | 142 | 0.376 | 1.064 | 1.467 | 0.200 |
| SAJ | 143 | 0.376 | 1.063 | 1.552 | 0.200 |
| SAK | 144 | 0.376 | 1.063 | 1.662 | 0.200 |
| SAL | 145 | 0.376 | 1.062 | 1.746 | 0.200 |
| SAM | 146 | 0.375 | 1.063 | 1.830 | 0.200 |
| SAN | 147 | 0.375 | 1.063 | 1.914 | 0.200 |
| SAP | 148 | 0.375 | 1.064 | 1.997 | 0.200 |
| SAR | 149 | 0.374 | 1.065 | 2.080 | 0.200 |
| SAS | 150 | 0.373 | 1.066 | 2.163 | 0.200 |
| SAT | 151 | 0.372 | 1.067 | 2.245 | 0.200 |
| SBA | 152 | 0.502 | 1.126 | 0.865 | 0.200 |
| SBB | 153 | 0.498 | 1.118 | 0.938 | 0.200 |
| SBC | 154 | 0.495 | 1.116 | 1.019 | 0.200 |
| SBD | 155 | 0.493 | 1.113 | 1.099 | 0.200 |
| SBE | 156 | 0.491 | 1.111 | 1.181 | 0.200 |
| SBF | 157 | 0.490 | 1.109 | 1.264 | 0.200 |
| SBG | 158 | 0.487 | 1.107 | 1.345 | 0.200 |
| SBH | 159 | 0.486 | 1.105 | 1.429 | 0.200 |
| SBJ | 160 | 0.485 | 1.104 | 1.512 | 0.200 |
| SBK | 161 | 0.483 | 1.103 | 1.597 | 0.200 |
| SBL | 162 | 0.483 | 1.102 | 1.704 | 0.200 |
| SBM | 163 | 0.483 | 1.102 | 1.788 | 0.200 |
| SBN | 164 | 0.483 | 1.102 | 1.872 | 0.200 |
| SBP | 165 | 0.482 | 1.103 | 1.955 | 0.200 |
| SBR | 166 | 0.481 | 1.103 | 2.039 | 0.200 |
| SBS | 167 | 0.480 | 1.104 | 2.122 | 0.200 |
| SBT | 168 | 0.479 | 1.105 | 2.205 | 0.200 |
| SBU | 169 | 0.477 | 1.106 | 2.288 | 0.200 |
| SCA | 170 | 0.705 | 1.022 | 1.101 | 0.200 |
| SCB | 171 | 0.706 | 1.022 | 1.186 | 0.200 |
| SCC | 172 | 0.707 | 1.022 | 1.270 | 0.200 |
| SCD | 173 | 0.708 | 1.022 | 1.354 | 0.200 |
| SCE | 174 | 0.708 | 1.022 | 1.439 | 0.200 |
| SCF | 175 | 0.708 | 1.022 | 1.523 | 0.200 |
| SCG | 176 | 0.708 | 1.022 | 1.607 | 0.200 |
| SCH | 177 | 0.707 | 1.022 | 1.692 | 0.200 |
| SCJ | 178 | 0.706 | 1.022 | 1.776 | 0.200 |
| SCK | 179 | 0.705 | 1.022 | 1.860 | 0.200 |
| SCL | 180 | 0.703 | 1.022 | 1.945 | 0.200 |
| SCM | 181 | 0.701 | 1.022 | 2.029 | 0.200 |
| SCN | 182 | 0.698 | 1.021 | 2.113 | 0.200 |

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. An airfoil, comprising:
an airfoil body having a plurality of film cooling holes that extend through an exterior surface of said airfoil body, wherein each of said plurality of film cooling holes break through said exterior surface at geometric coordinates in accordance with Cartesian coordinate values of X, Y and Z as set forth in Table 1, wherein each of said geometric coordinates is measured from a center point of a pin hole located on a leading edge rail of a platform of the airfoil, and said Cartesian coordinate values of Table 1 are expressed in inches.

2. The airfoil as recited in claim 1, wherein said airfoil is a first stage turbine vane.

3. The airfoil as recited in claim 1, wherein said plurality of film cooling holes are spaced along a span of said airfoil body in multiple collinearly aligned rows.

4. The airfoil as recited in claim 1, wherein a first portion of said plurality of film cooling holes are cone shaped and a second portion of said plurality of film cooling holes are round shaped.

5. The airfoil as recited in claim 1, wherein at least a portion of said plurality of film cooling holes are arranged in a herringbone configuration.

6. The airfoil as recited in claim 1, wherein said plurality of film cooling holes are disposed on a pressure side, a suction side and a leading edge of said airfoil body.

7. The airfoil as recited in claim 6, wherein said plurality of film cooling holes on said pressure side are cone shaped and at least a portion of said plurality of film cooling holes on said suction side are cone shaped.

8. The airfoil as recited in claim 1, wherein a first portion of said plurality of film cooling holes from a point of said airfoil body toward an outer platform are angled toward said outer platform and a second portion of said plurality of film cooling holes from said point toward an inner platform are angled inwardly toward said inner platform.

9. An airfoil, comprising:
an airfoil body that includes a pressure side and a suction side that extend in chord between a leading edge and a trailing edge and extend in span between an inner platform and an outer platform;
multiple rows of film cooling holes disposed through an exterior surface of said airfoil body on at least said pressure side, said suction side and said leading edge, wherein said multiple rows of film cooling holes of said pressure side include cone shaped film cooling holes, said multiple rows of film cooling holes of said suction side include both cone shaped film cooling holes and round shaped film cooling holes, and said multiple rows of film cooling holes of said leading edge include round shaped film cooling holes, and at least a portion of said multiple rows of film cooling holes of said pressure side and at least a portion of said multiple rows of film cooling holes of said suction side are arranged in a herringbone configuration; and
wherein each film cooling hole of said multiple rows of film cooling holes break through said exterior surface at geometric coordinates in accordance with Cartesian coordinate values of X, Y and Z as set forth in Table 1, wherein each of said geometric coordinates is measured from a center point of a pin hole located on a leading edge rail of said inner platform, and said Cartesian coordinate values of Table 1 are expressed in inches.

10. The airfoil as recited in claim 9, wherein at least a portion of said multiple rows of film cooling holes are disposed on fillets that extend between both of said inner platform and said airfoil body and said outer platform and said airfoil body.

11. A vane, comprising:
an airfoil body that extends between an inner platform and an outer platform, wherein said airfoil body includes a plurality of film cooling holes that extend through an exterior surface of said airfoil body, wherein each of said plurality of film cooling holes break through said exterior surface at geometric coordinates in accordance with Cartesian coordinate values of X, Y and Z as set forth in Table 1, wherein each of said geometric coordinates is measured from a center point of a pin hole located on a leading edge rail of said inner platform, and said Cartesian coordinate values of Table 1 are expressed in inches.

12. The vane as recited in claim 11, wherein said vane is a first stage turbine vane.

13. The vane as recited in claim 11, wherein a first portion of said plurality of film cooling holes are cone shaped and a second portion of said plurality of film cooling holes are round shaped.

14. The vane as recited in claim 11, wherein at least a portion of said plurality of film cooling holes are arranged in a herringbone configuration.

15. The vane as recited in claim 11, wherein said plurality of film cooling holes on a pressure side of said airfoil body are cone shaped and at least a portion of said plurality of film cooling holes on a suction side of said airfoil body are cone shaped.

* * * * *